Jan. 9, 1951
G. A. ANDERSON
2,537,324
STOCK WATER TANK COVER
Filed May 14, 1948
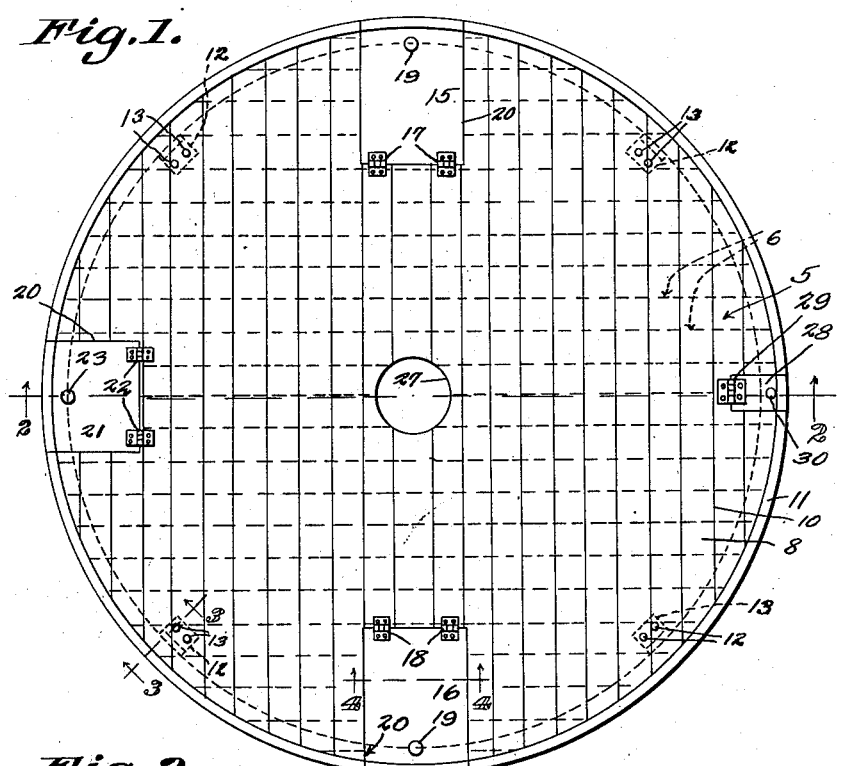
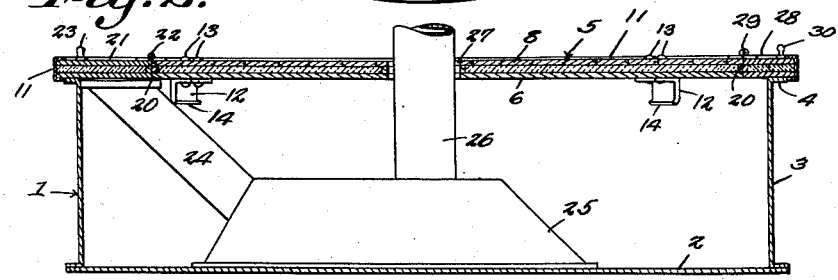
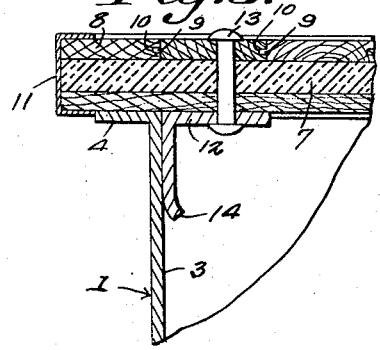
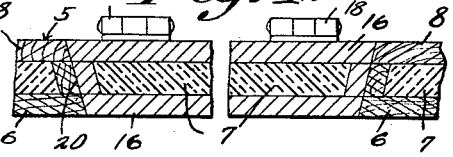
G. A. Anderson
INVENTOR
BY *CA Snow & Co.*
ATTORNEYS.

Patented Jan. 9, 1951

2,537,324

UNITED STATES PATENT OFFICE 2,537,324

STOCK WATER TANK COVER

Gay A. Anderson, Sloan, Iowa

Application May 14, 1948, Serial No. 26,993

1 Claim. (Cl. 217—56)

This invention relates to improvements in stock water tank covers.

An object of the invention is to provide an improved cover construction for stock watering tanks.

Another object of the invention is to provide an improved insulated cover construction for stock watering tanks which will provide warm water for the stock in winter and cool water for the stock in summer time.

A further object of the invention is to provide an improved clamp on type insulated cover construction and heater for stock watering tanks.

A still further object of the invention is to provide an improved cover and heater construction for stock watering tanks which will be highly efficient in operation, and relatively inexpensive to manufacture and produce.

Other objects will appear as the description proceeds.

In the accompanying drawings which form a part of this application:

Figure 1 is a top plan view of the improved cover for stock watering tanks.

Fig. 2 is a sectional view taken on the line 2—2 of Fig. 1.

Fig. 3 is a sectional view taken on the line 3—3 of Fig. 1.

Fig. 4 is a sectional view taken on the line 4—4 of Fig. 1.

Like characters of reference are used throughout the following specification and the accompanying drawings to designate corresponding parts.

In carrying out the invention, there is provided a circular water tank for stock generally designated by the reference numeral 1, and having a bottom 2 with an upstanding annular side wall 3, preferably made of metal. An outwardly extending annular flange 4 is formed about the upper or top edge of the side wall 3.

The improved cover 5 comprises a laminated structure including a round base portion 6, an intermediate layer of insulation 7, and an upper layer formed by a plurality of boards 8 having tongues 9 and grooves 10, and a U-shape metal edge binding rim 11 disposed about the periphery of the cover 5.

Four depending L-shape resilient metal locking flanges 12 are secured by the bolts 13 to the under surface of the cover 5, said bolts 13 extending through the cover 5. The lower ends of the flanges 12 are inwardly flared at 14 to facilitate the positioning of the cover 5 upon the water tank 1.

Oppositely disposed trap doors 15 and 16 are hinged at 17 and 18 to the cover 5, and are provided with the knob handles 19 for raising the same to permit stock to drink from the tank 1 through the openings 20 cut in the edges of the top or cover 5.

A similar trap door 21 is hinged at 22 and is provided with a knob handle 23, so that when the trap door 21 is raised fuel and fuel oil may be fed through the chute 24 into the centrally disposed burner, or heating casing 25 located near the center of the bottom of the tank 1. A smoke pipe 26 extends upwardly from the heating casing 25 through the opening 27 in the cover 5.

A small trap door 28 is hinged at 29 opposite the trap door 21 through which a water pipe (not shown) may be passed to fill the water tank 1. A knob handle 30 is provided for the trap door 21 for raising and lowering the same.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A cover for a stock watering tank comprising a plurality of flat laminations including a bottom lamination formed from a plurality of side-by-side longitudinally contacting elongated strips, a top lamination of side-by-side elongated longitudinally contacting strips disposed perpendicular to the strips of the bottom lamination, insulating material spacing said top and bottom laminations apart, said insulating material extending fully to the periphery of the cover, a metallic hoop of U-shaped cross section and including top and bottom flanges extended peripherally around the cover and gripping between its flanges the laminations of the cover, said hoop enclosing and sealing the peripheral portion of the insulating lamination, said cover having marginal indentations and said indentations being lined with side walls to enclose the insulating lamination, and hinged trap doors mounted in said indentations.

GAY A. ANDERSON.

REFERENCES CITED

The following references are of record in the file of this patent:

UNITED STATES PATENTS

| Number | Name | Date |
| --- | --- | --- |
| 281,374 | Kivitts | July 17, 1883 |
| 487,806 | Weed | Dec. 13, 1892 |
| 683,391 | Ellis | Sept. 24, 1901 |
| 962,449 | Miller | June 28, 1910 |
| 994,543 | Smith | June 6, 1911 |
| 1,254,937 | Ryon | Jan. 29, 1918 |
| 1,346,307 | Eaton | July 13, 1920 |
| 1,741,563 | Graham | Dec. 31, 1929 |
| 2,092,139 | Ramer | Sept. 7, 1937 |
| 2,164,716 | Kreft | July 4, 1939 |

FOREIGN PATENTS

| Number | Country | Date |
| --- | --- | --- |
| 116,042 | Switzerland | Aug. 2, 1926 |